US008277269B1

(12) United States Patent
Alby et al.

(10) Patent No.: US 8,277,269 B1
(45) Date of Patent: Oct. 2, 2012

(54) TORQUE TRANSMITTING DEVICE AND SYSTEM FOR MARINE PROPULSION

(75) Inventors: Jeremy L. Alby, Oshkosh, WI (US); Daniel J. Guse, Fond du Lac, WI (US); Terence C. Reinke, Oshkosh, WI (US); Edward M. Thull, Omro, WI (US)

(73) Assignee: Brunswick Corporation, Lake Forest, IL (US)

( * ) Notice: Subject to any disclaimer, the term of this patent is extended or adjusted under 35 U.S.C. 154(b) by 194 days.

(21) Appl. No.: 12/833,399

(22) Filed: Jul. 9, 2010

(51) Int. Cl.
*B63H 5/07* (2006.01)
*B63H 1/00* (2006.01)
(52) U.S. Cl. ............................................ 440/79; 416/2
(58) Field of Classification Search .................. 440/49, 440/50, 75, 79, 84, 83; 419/2, 134 R, 93 A, 419/204 R, 245 A, 244 B
See application file for complete search history.

(56) References Cited

U.S. PATENT DOCUMENTS

| | | | |
|---|---|---|---|
| 3,444,932 A | 5/1969 | Wiezien | |
| 3,748,061 A | 7/1973 | Henrich | |
| 4,566,855 A | 1/1986 | Costabile et al. | |
| 4,575,310 A | 3/1986 | Otani | |
| 4,626,112 A | 12/1986 | Kramer | |
| 4,642,057 A | 2/1987 | Frazzell et al. | |
| 4,701,151 A | 10/1987 | Uehara | |
| 4,842,483 A | 6/1989 | Geary | |
| 4,900,281 A | 2/1990 | McCormick | |
| 5,201,679 A | 4/1993 | Velte, Jr. et al. | |
| 5,244,348 A | 9/1993 | Karls et al. | |
| 5,252,028 A | 10/1993 | LoBosco et al. | |
| 5,322,416 A | 6/1994 | Karls et al. | |
| 5,908,284 A | 6/1999 | Lin | |
| 6,383,042 B1 | 5/2002 | Neisen | |
| 6,471,481 B2 * | 10/2002 | Chen | 416/134 R |
| 6,478,543 B1 | 11/2002 | Tuchscherer et al. | |
| 6,672,834 B2 * | 1/2004 | Chen | 416/2 |
| 6,685,432 B2 * | 2/2004 | Chen | 416/134 R |
| 6,773,232 B2 | 8/2004 | Powers | |
| 7,086,836 B1 | 8/2006 | Sheth et al. | |

* cited by examiner

*Primary Examiner* — Daniel Venne
(74) *Attorney, Agent, or Firm* — Andrus, Sceales, Starke & Sawall, LLP

(57) ABSTRACT

A torque transmitting device and related a marine propulsion system include an adapter that comprises a first portion shaped to engage in torque-transmitting relation with a propulsor shaft of the marine propulsion system so that rotation of the propulsor shaft about the axis of rotation causes synchronous rotation of the first portion about the axis of rotation. A second portion is shaped to engage in torque-transmitting relation with a propulsor hub of the marine propulsion system. The second portion is connected to the first portion by a plurality of elongated torsional members that are integrally attached to at least one of the first and second portions. The elongated torsional members are resilient so as to allow the first portion and second portion to rotate relative to each other about the axis of rotation.

25 Claims, 9 Drawing Sheets

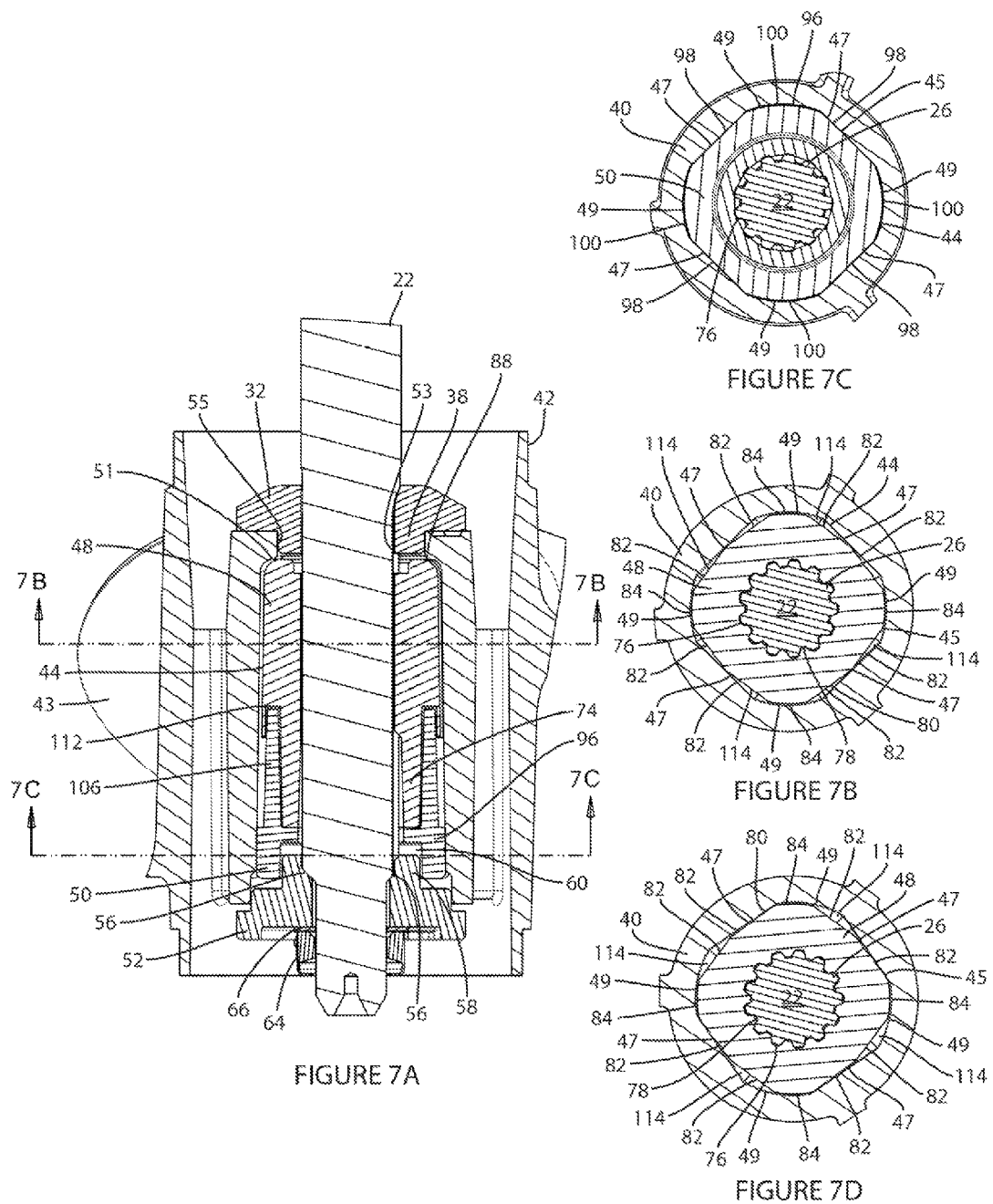

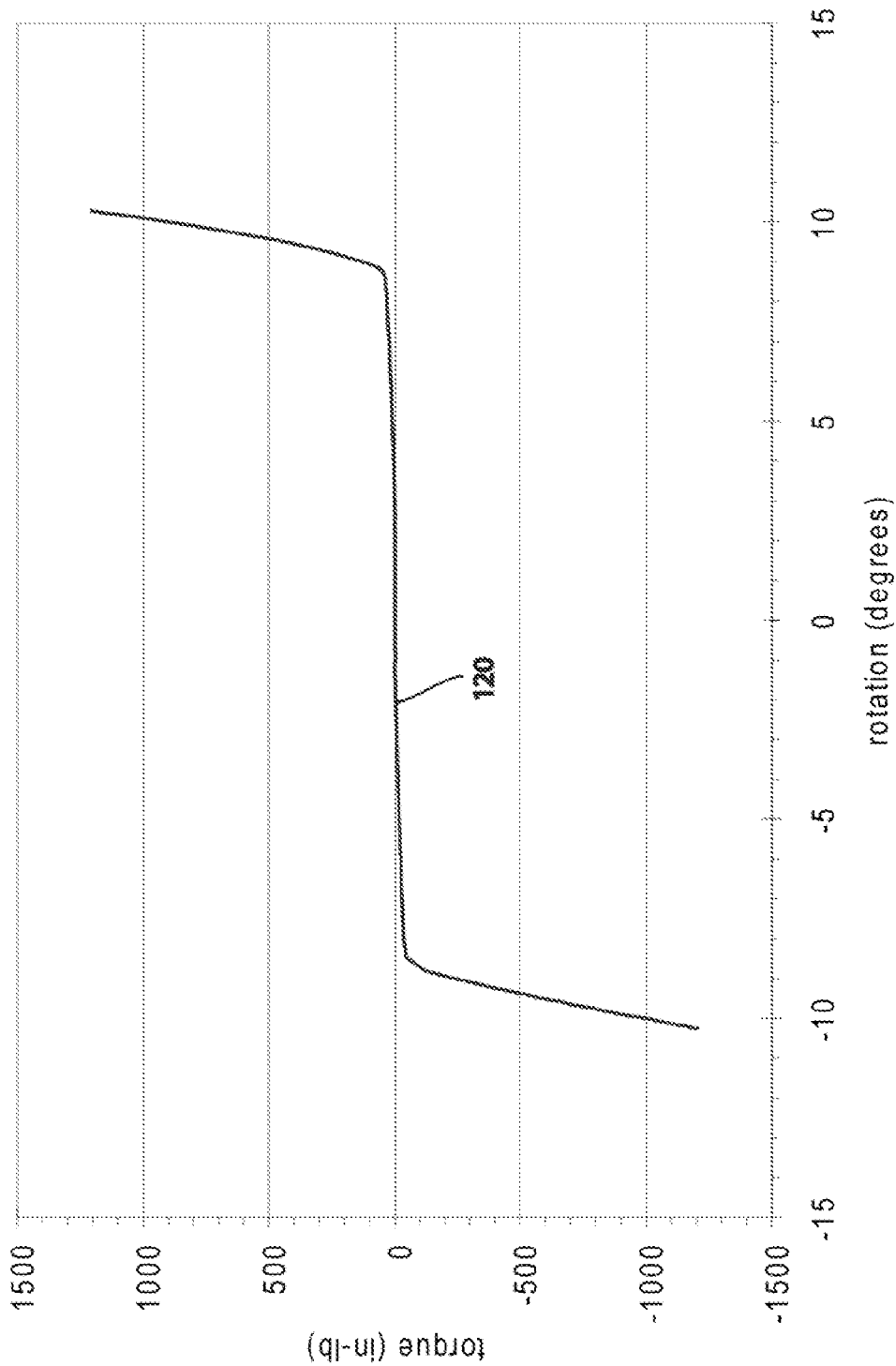

TORQUE TRANSMITTING DEVICE AND SYSTEM FOR MARINE PROPULSION

FIELD

The present disclosure relates to marine propulsion systems, and more specifically to devices and systems for transmitting torque from a rotating propulsor shaft to a propulsor hub.

BACKGROUND

Torque transmitting devices and systems for marine propellers or impellers (hereinafter propulsors) are disclosed in commonly owned U.S. Pat. Nos. 6,478,543 and 7,086,836, the disclosures of which are fully incorporated herein by reference.

SUMMARY

The present disclosure discloses inventive torque transmitting devices and systems for mounting a propulsor to a propulsor shaft. In some examples, the torque transmitting devices can be manufactured in a less costly manner than the prior art arrangements and yet still achieve desired functionality, such as dual rate transmission of torque and lessened noise emanating from various connections between shafts, clutch, gears in the drive system of the marine propulsion system. This advantageously allows for use of the devices in smaller and lower cost marine applications. In some examples, the torque transmitting devices eliminate the need for expensive titanium torsion rods and adapter pieces that add complexity to both manufacture and assembly.

In a non-limiting example, a torque transmitting device includes an adapter having a first portion shaped to engage in torque-transmitting relation with a propulsor shaft of a marine propulsion system so that rotation of the propulsor shaft about an axis of rotation causes synchronous rotation of the first portion about the axis of rotation. A second portion is shaped to engage in torque-transmitting relation with a propulsor hub of the marine propulsion system. The second portion is connected to the first portion by a plurality of elongated torsional members that are integrally attached to at least one of the first and second portions. The elongated torsional members are resilient so as to allow the first portion and second portion to rotate relative to each other about the axis of rotation.

In another non-limiting example, a marine propulsion system comprises a propulsor shaft rotatable about an axis of rotation, a propulsor hub rotatable about the axis of rotation, and an adapter extending along the axis of rotation. The adapter comprises a first portion shaped to engage in torque-transmitting relation with the propulsor shaft so that rotation of the propulsor shaft about the axis of rotation causes synchronous rotation of the first portion about the axis of rotation. A second portion is shaped to engage in torque-transmitting relation with the propulsor hub. The second portion is connected to the first portion by a plurality of elongated torsional members that are integrally attached to at least one of the first and second portions. The elongated torsional members are resilient so as to allow the first portion and second portion to rotate relative to each other about the axis of rotation.

BRIEF DESCRIPTION OF THE DRAWINGS

FIG. 7A is a sectional view of a system including a propulsor hub receiving a torque transmitting device and a propulsor shaft.

FIG. 7B is a view of section 7B-7B taken in FIG. 7A.

FIG. 7C is a view of section 7C-7C taken in FIG. 7A.

FIG. 7D is a view of section 7B-7B after the second portion is axially rotated with respect to the first portion.

FIG. 8 is a graph depicting torque transfer rates of the non-limiting example shown in FIG. 2.

DETAILED DESCRIPTION OF THE DRAWINGS

In the present description, certain terms have been used for brevity, clearness and understanding. No unnecessary limitations are to be implied therefrom beyond the requirement of the prior art because such terms are used for descriptive purposes only and are intended to be broadly construed. The different devices and systems described herein may be used alone or in combination with other devices or systems. It is to be expected that various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

Figure 1:
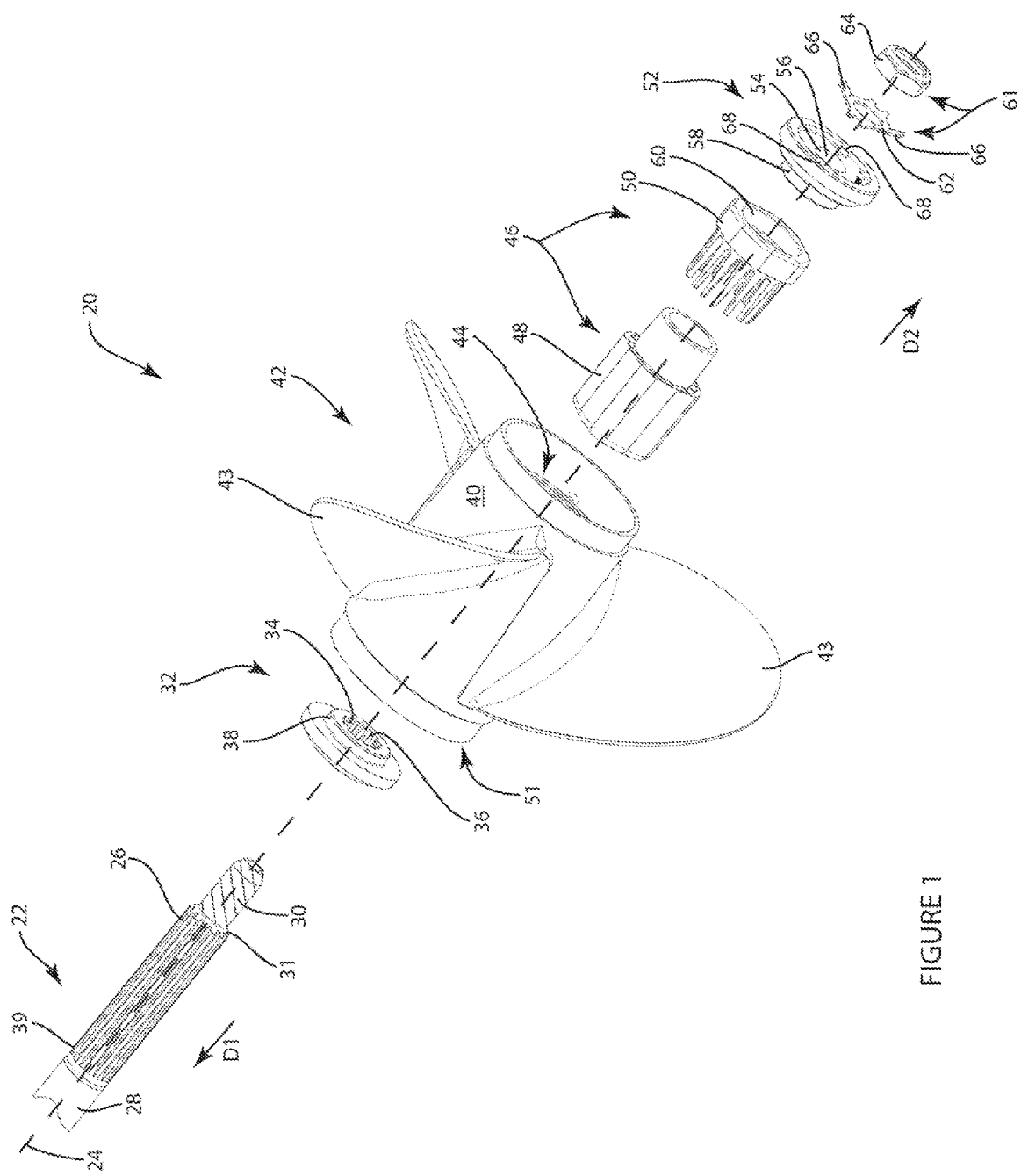
FIG. 1 is an exploded isometric view of a non-limiting example of a marine propulsion system according to the present disclosure.
Figure 2:
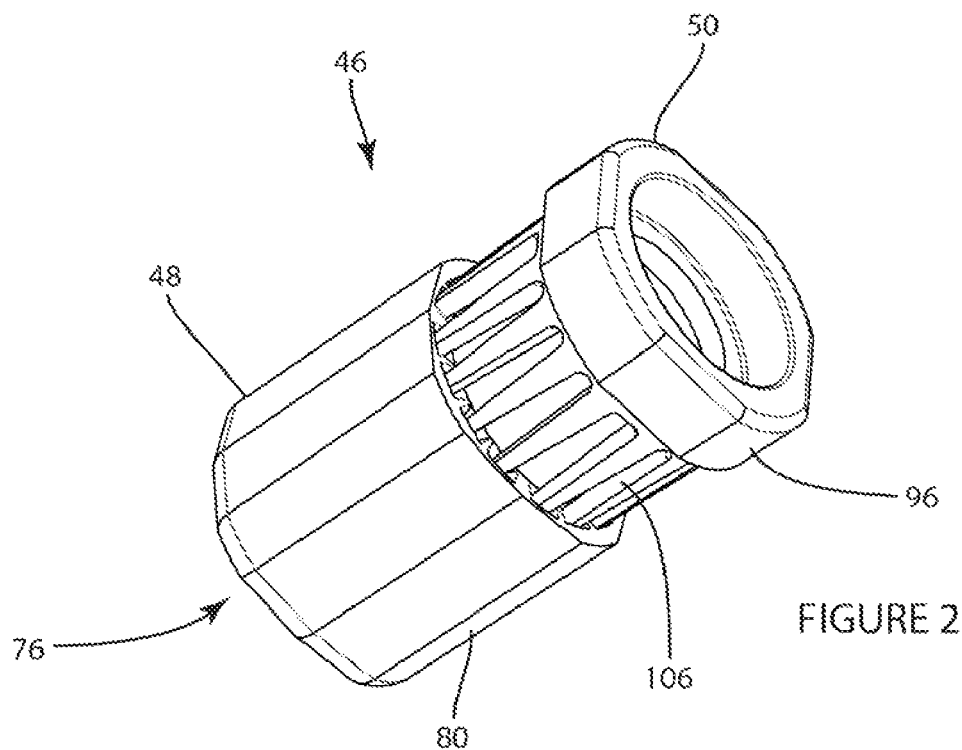
FIG. 2 is an isometric view of the torque transmitting device.
Figure 3:
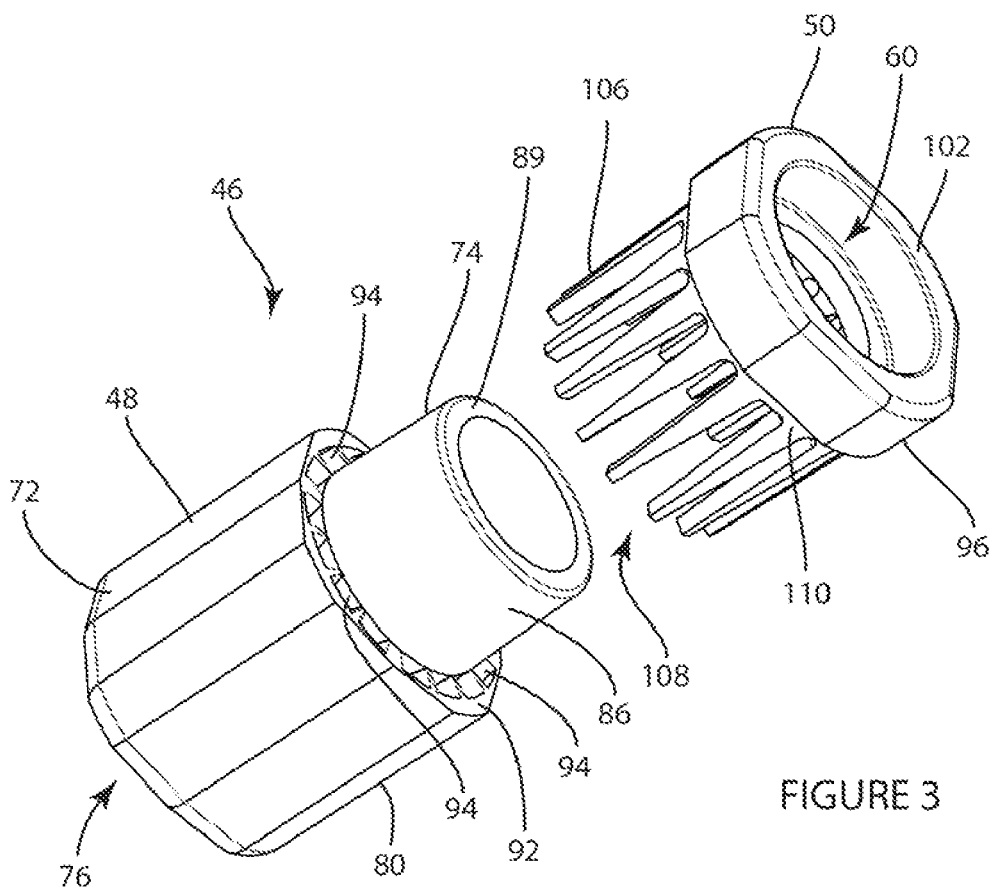
FIG. 3 is an exploded view of a first non-limiting example of a torque transmitting device.
Figure 4A:
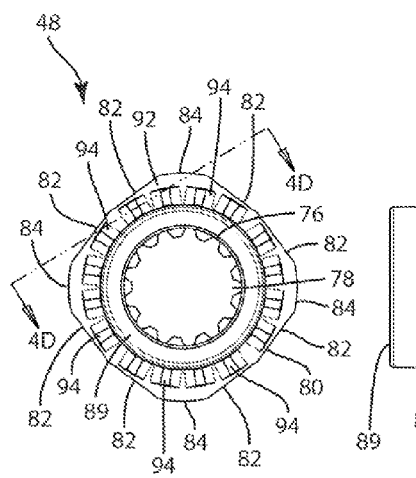
FIG. 4A is an end view of a first portion of the torque transmitting device.
Figure 4B:
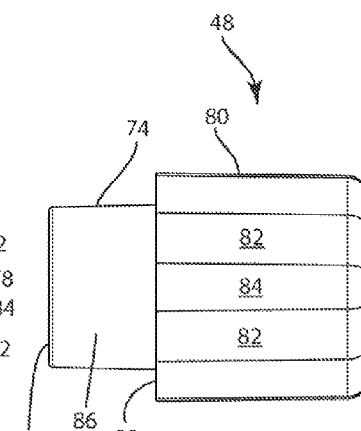
FIG. 4B is a side view of the torque transmitting device.
Figure 4C:
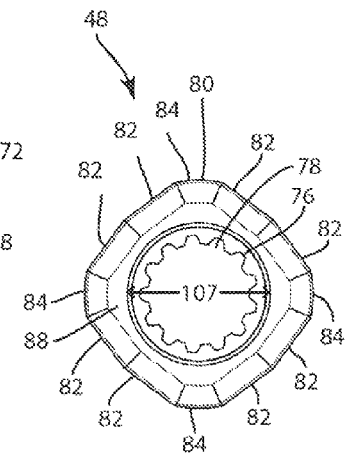
FIG. 4C is a view of a second, opposite end of the torque transmitting device.
Figure 4D:
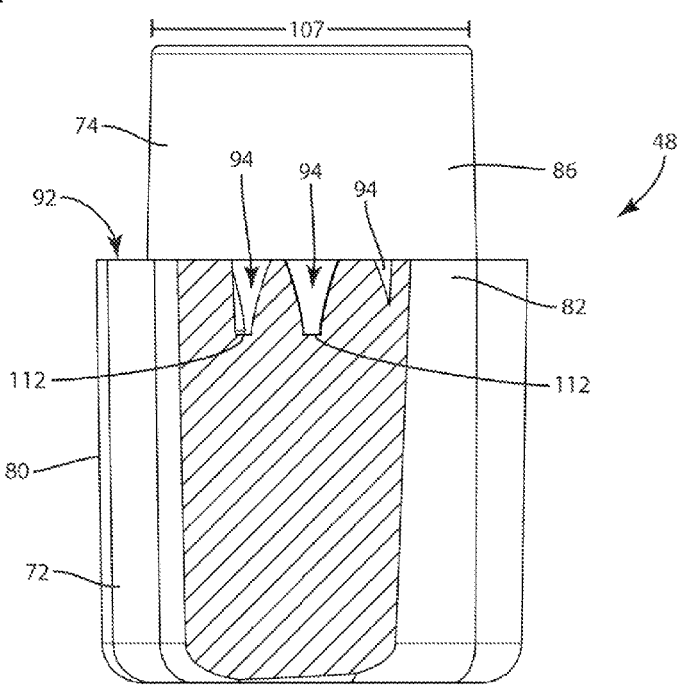
FIG. 4D is a view of section 4D-4D taken in FIG. 4A.
Figure 5A:
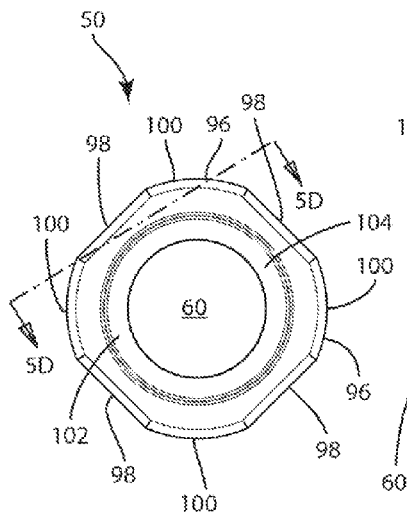
FIG. 5A is an end view of a first portion of the torque transmitting device.
Figure 5B:
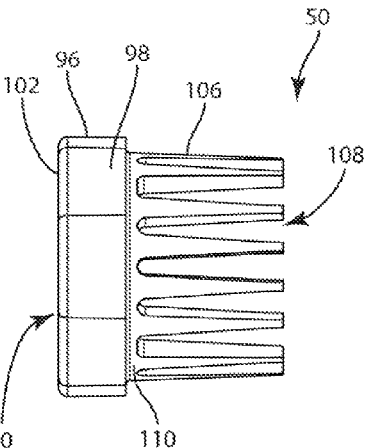
FIG. 5B is a side view of the torque transmitting device.
Figure 5C:
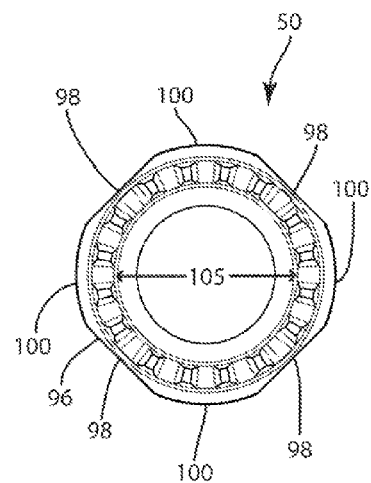
FIG. 5C is a view of a second, opposite end of the torque transmitting device.
Figure 5D:
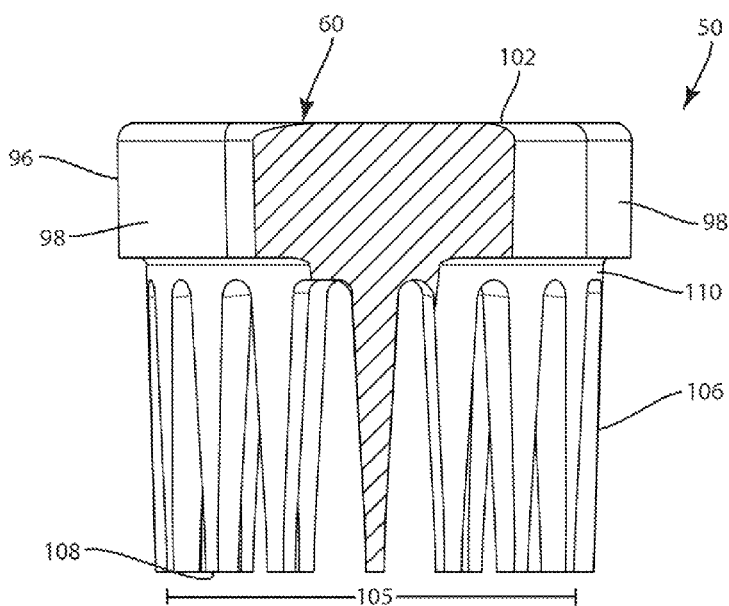
FIG. 5D is a view of section 5D-5D taken in FIG. 5A.

FIG. 1 shows a marine propulsion system 20 including a propulsor shaft 22 that is rotatable about a central axis 24 of rotation. Although not depicted in FIG. 1, the propulsor shaft 22 is typically disposed in a gear housing of a marine propulsion unit, such as an outboard motor or a stern drive unit. Typically, the propulsor shaft 22 is connected in torque transmitting relation with the driveshaft of a marine propulsion system which, in turn, is connected in torque transmitting relation with a crankshaft of an internal combustion engine.

In the non-limiting example of FIG. 1, the propulsor shaft 22 is an elongated rotatable member having a plurality of circumferentially spaced and axially extending splines 26 disposed along part of the shaft 22. Specifically, the splines 26 extend between an inner portion 28 and a threaded end portion 30 that has an outer diameter that is smaller than the outer diameter of the inner portion 28. A shoulder 31 is defined at the transition between the splines 26 and the threaded end portion 30.

In this example, the system 20 also includes a first thrust washer 32 that mounts on the propulsor shaft 22 to prevent a propulsor hub 40, which is further described herein below, from translating axially in a first direction D1 past a predetermined location on the propulsor shaft 22. The first thrust washer 32 has an inner surface 34 that defines a plurality of axially extending recesses 36 that are shaped to engage with the plurality of splines 26 on the propulsor shaft 22 so that the first thrust washer 32 rotates in synchrony with the propulsor shaft 22 when the propulsor shaft 22 is driven into rotation about the central axis 24 of rotation. The term "synchrony" in this disclosure means at the same rate and in the same phase, wherein as the shaft 22 rotates, so does the washer 32, with a fixed rotational relationship remaining between the two. The thrust washer 32 also includes an outwardly protruding annular ridge 38.

FIG. 1 also depicts a propulsor 42 and a hub 40 that is rotatable about the central axis 24 of rotation. In FIG. 1, the propulsor 42 is a propeller, but it should be understood that the propulsor 42 could instead be an impeller or other propulsive configuration. The hub 40 is a generally cylindrical member and a plurality of blades 43 extend radially outwardly therefrom. The hub 40 has an inner circumferential surface 44 for receiving an engaging with the propulsor shaft 22 via an adapter 46, as will be discussed further herein below. Specifically, the inner circumferential surface 44 includes a plurality of facets 45 including four substantially flat side surfaces 47 and four substantially rounded corner surfaces 49 (see FIGS. 7B-7D). The number and configuration of the facets 45 may vary. The hub 40 also has a partially closed end 51 (see FIG. 7A) defining an aperture 53 shaped to receive the propulsor shaft 22. The closed end 51 defines a recess 55 shaped to receive the annular ridge 38 on the thrust washer 32, as will be described further herein below.

FIG. 1 also depicts an adapter 46 which is elongated along the axis 24 of rotation and which includes a first portion 48 and a second portion 50. The first portion 48 is shaped to engage in torque-transmitting relation with the propulsor shaft 22 so that rotation of the propulsor shaft 22 about the axis 24 of rotation causes synchronous rotation of the first portion 48 about the axis 24 of rotation. The second portion 50 is shaped to engage in torque-transmitting relation with the propulsor hub 40 such that rotation of the second portion 50 about the axis 24 of rotation causes synchronous rotation of the hub 40 about the axis 24 of rotation. The structure and functions of the adapter 46 will be described further herein below.

FIG. 1 also depicts a second thrust washer 52. In this example the second thrust washer 52 mounts on the propulsor shaft 22 and prevents the propulser hub 40 from translating axially in a second, opposite direction D2 past the shoulder 31 on the propulsor shaft 22. Similar to the first thrust washer 32, the second thrust washer 52 has an inner surface 54 defining a plurality of axially extending recesses 56 (see FIG. 7A) that are shaped to engage with the plurality of splines 26 on the propulsor shaft 22 so that the second thrust washer 52 rotates in synchrony with the propulsor shaft 22 about the axis 24 of rotation. The second thrust washer 52 also includes an annular ridge 58 sized smaller than an annular recess 60 on the second portion 50, as will be described further herein below.

FIG. 1 also depicts a locking device 61 for preventing axial translation of the second thrust washer 52. In the example shown, the locking device 61 includes a tab washer 62 and a nut 64. The tab washer 62 includes a plurality of tabs 66 for engaging with flanges 68 on an inner face 70 of the second thrust washer 52, thus preventing relative rotation between the tab washer 62 and the second thrust washer 52.

FIGS. 2, 3 and 4A-4D depict the first portion 48 of the adapter 46 in more detail. The first portion 48 includes first end portion 72 and a second end portion 74. The first end portion 72 has a larger diameter than the second end portion 74 and has an inner surface 76 (see FIG. 4A, for example) that defines a plurality of axially extending recesses 78 that are shaped to engage with the plurality of splines 26 on the propulsor shaft 22 so that the first portion 48 rotates in synchrony with the propulsor shaft 22 about the central axis 24 of rotation. In the example shown, the plurality of recesses 78 do not extend along the entire axial length of the first portion 48, but rather extend only part way along the first end portion 72. The first end portion 72 also has an outer circumferential surface 80 that is shaped to be received by the propulsor hub 40 so that lost motion occurs between the first portion 48 and the propulsor hub 40 during rotation of the propulsor shaft 22 about the central axis 24 of rotation, as will be described further herein below. In the example shown, the outer circumferential surface 80 includes a plurality of substantially flat side surfaces 82 and a plurality of rounded corner surfaces 84. In this example, there are a total of eight substantially flat side surfaces 82, two per side, and a total of four rounded corner surfaces 84. The first end portion 72 also has an outer end face 88 that is trapezoidal in cross section and shaped to abut the closed end 51 of the propulsor hub 40 (see FIG. 7A). The second end portion 74 includes a substantially smooth outer surface 86 and has an outer end face 89 that is circular in cross section. Other embodiments and variations of this arrangement can be employed. A shoulder 92 is located at the junction between the first and second end portions 72, 74. At the shoulder 92 are defined a plurality of recesses or openings 94, which taper inwardly away from the shoulder 92. The particular construction of the first portion 48 of the adapter 46 can vary widely depending upon the construction of the inner circumferential surface 44 of the hub 40 and also depending upon the particular functional attributes desired of the adapter 46. The first portion 48 of the adapter 46 can be constructed of a variety of materials. In a particularly preferred example, the first portion 48 is constructed of an acetal homopolymer (such as commercially available Delrin® 150 NC010, Delrin 311 DP NC010) or an acetal resin (such as commercially available Delrin® 150E NC010).

FIGS. 2, 3 and 5A-5D depict the second portion 50 of the adapter 46 in more detail. The second portion 50 includes an outer surface 96 shaped to be received by the propulsor hub 40 and to attach the second portion 50 to the propulsor hub 40 for rotation in synchrony with the propulsor hub 40 about the axis 24 of rotation. In the example shown, the outer surface 96 defines a plurality of substantially flat side surfaces 98 and a plurality of rounded corner surfaces 100. In the example shown, there are four flat side surfaces 98, one per side, and four rounded corner surfaces 100. This configuration may vary. The second portion 50 also includes an end face 102 that is trapezoidal in cross section and defines an annular recess 60 shaped to receive the annular ridge 58 on the second thrust washer 52 in a manner allowing for free rotation of the adapter 48 relative to the second thrust washer 52 about the central axis 24 of rotation. The construction of the second portion 50 of the adapter 46 can vary depending upon the configuration of the inner circumferential surface 44 of the hub 40 and upon the desired functional attributes of the adapter 46. The second portion 50 of the adapter 46 can be constructed of a variety of materials. In a particularly preferred example, the second portion 50 is constructed of a high-strength plastic material such as a 25% glass-reinforced acetal homopolymer (such as commercially available Delrin 525 GR NC000), a 30% glass-reinforced Polyphenylene Ether+Nyone "PE+PA" Alloy (such as commercially available Noryl GTX Resin GTX830), or a glass-filled Polyphenylene Ether+Polystyrene+Nylon "PPE+PS+PA" Alloy (such as commercially available Noryl GTX Resin, GTX8720).

The second portion 50 is connected to the first portion 48 by a plurality of elongated torsional members 106 that are integrally attached to at least one of the first and second portions 48, 50. In this example, the plurality of torsional members includes tines, which extend from and are integrally attached to the second portion 50. Each torsional member 106 includes a free end 108 and a fixed end 110 that is integral with the second portion 50. Each torsional member 106 is tapered outwardly from the free end 108 towards the fixed end 110 and is sized to be received by an opening 94 in the plurality of openings. Each torsional member 106 has a length $L_A$ sized longer than a length $L_B$ of a respective opening 94 into which the respective torsional member 106 extends. The plurality of torsional members 106 together defines an inner diameter 105 (see FIG. 5D) that is slightly larger than the outer diameter 107 (see FIG. 4D) of the second end portion 74 such that the plurality of torsional members 106 can be slid onto the outer diameter 107 of the second end portion 74 with a friction fit therebetween until the free ends 108 of the torsional members 106 reside in the bottom 112 of each respective opening 94 (see FIGS. 6A and 6B). The first and second portions 48, 50 therefore are separable components and are removably attached by the elongated torsional members 106.

With reference to FIGS. 1 and 7A, to assemble the system 20, the thrust washer 32 is fed on to the propulsor shaft 22 in the direction D1 with the annular ridge 36 facing outwardly, i.e. towards the threaded end portion 30, until the thrust washer 32 reaches a tapered end portion 39 of the splines 26. Engagement between the tapered end portion 39 and the recesses 36 prevents further axial movement of the thrust washer 32 along the shaft 22 in the direction D1. Next, the adapter 46 is inserted into the propulsor hub 40 in the orientation shown in FIG. 1 so that the outer end face 88 of the adapter 46 abuts or is located proximate to the closed end 51 and with a clearance therebetween. The adapter 46 and propulsor hub 40 are fed onto the propulsor shaft 22 until the ridge 38 on the first thrust washer 32 seats in the annular recess 55 formed in the end 51 of the propeller hub 40 in such a manner that the propeller hub 40 can rotate freely about the axis 24 with respect to the thrust washer 32. Next, the second thrust washer 52 is fed onto the shaft 22 until the ridge 58 seats in the recess 60 and the body of the thrust washer 52 abuts the shoulder 31. Finally, the tab washer 62 is fed onto the shaft 22 so that the tabs 66 mate with the flanges 68 and the nut 64 is thread tightly onto the threaded end portion 30. In this position, the thrust washers 32, 54 prevent axial movement of the hub 40 and adapter 46 in directions D1 and D2 past predetermined points, but do not place axial pressure on these components to limit their free rotation about axis 24. Rather the thrust washers 32, 54 allow free rotation of the hub 40 and adapter 46 about the axis 24 of rotation.

Figure 6A:
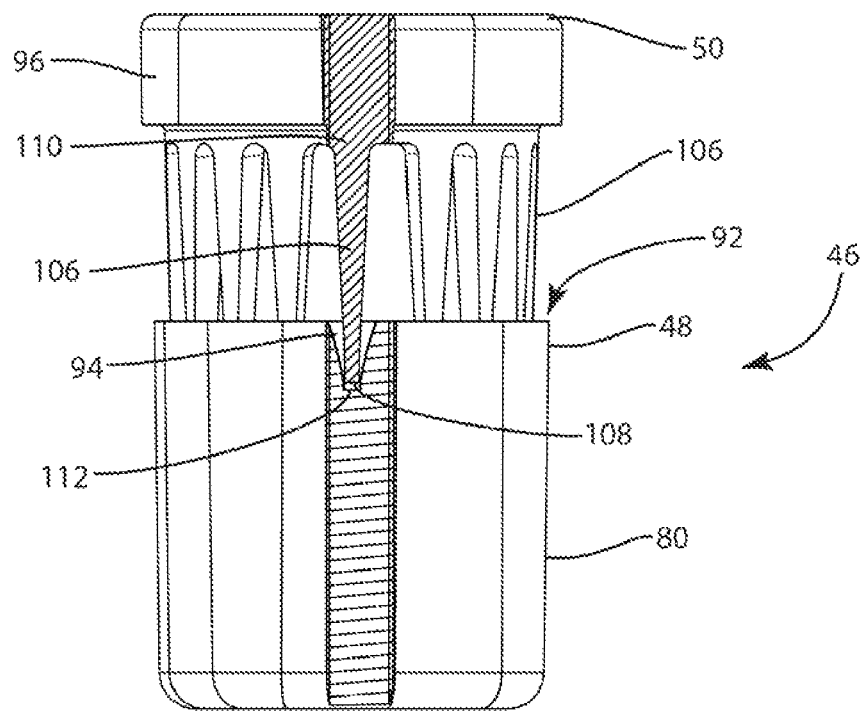
FIG. 6A is a view of the torque transmitting device, shown partially in section, wherein the first and second portions are axially aligned.

With reference to FIGS. 6A, 6B, and 7B-D, operation of the system 20 will be described. When the propulsor shaft 22 is not being driven into rotation and the system 20 is at rest, the first and second portions 48, 50 of the adapter 46 are aligned with each other along the axis 24 of rotation, as shown in FIG. 6A. The torsional members 106 resiliently maintain a generally straight length extending along the axis 24 and into the bottoms 112 of the tapered sides of the openings 94 such that the free ends 108 of the torsional members 106 reside at or near the bottoms 112 of the openings 94.

As shown in FIGS. 7B and 7C, the inner circumferential surface 44 of the hub 40 engages in a fixed relationship with the outer surface 96 of the second portion 50 of the adapter 46. This can be accomplished in a number of different ways. In the example shown, the side surfaces 47 of the inner circumferential surface 44 abut the side surfaces 98 of the second portion 50. Simultaneously, the corner surfaces 49 of the inner circumferential surface 44 abut with the corner surfaces 100 of the second portion 50. This is shown most clearly in the cross-sectional view of FIG. 7C. The hub 40 and second portion 50 are therefore engaged with each other in a friction fit and in such a manner so as to rotate in synchrony about the axis 24. That is, little or no rotational movement occurs between the second portion 50 and the hub 40 when the propulsor shaft 22 is driven into rotation.

Similarly, the propulsor shaft 22 is engaged with the first portion 48 of the adapter 46 such that when the propulsor shaft 22 is driven into rotation about the axis 24 of rotation the first portion 48 rotates in synchrony therewith. This is accomplished by engagement between the splines 26 on the propulsor shaft 22 and the recesses 78 on the inner surface 76 of the first portion 48 (see FIG. 7B).

However, as shown in FIG. 7B, the outer surface 80 of the first portion 48 of the adapter 46 is not rotationally fixed with respect to the inner circumferential surface 44 of the propulsor hub 40. Rather, gaps 114 exists between the outer surface 80 of the first portion 48 and the inner circumferential surface 44 of the propulsor hub 40. This arrangement can be configured in a number of different ways. In the example shown, the gaps 114 exist respectively between the flat side surfaces 82 and rounded corner surfaces 84 of the outer surface 80 and the side surfaces 47 and corner surfaces 49 of the inner circumferential surface 44. The outer surface 80 is thus specifically configured to create these gaps 114 so as to allow for lost motion to occur between the first portion 48 and the hub 40 as the propulsor shaft 22 is driven into rotation.

FIGS. 7B and 7D demonstrate the lost motion by showing rotation of the propulsor hub 40 with respect to the first portion 48. FIG. 7B shows the arrangement prior to rotation of the propulsor shaft 22 in a counterclockwise direction and FIG. 7D shows the arrangement after rotation of the propulsor shaft 22 in the counterclockwise direction. Similar relative lost motion movement between the first portion 48 and hub 40 occurs when the propulsor shaft 22 is rotated in the opposite, clockwise direction. In a preferred example, the adapter 46 is configured such that the first portion 48 is rotatable through the lost motion by less than 9 degrees in one direction about the axis 24 of rotation and by less than 9 degrees in the other direction about the axis 24 of rotation. This is accomplished by specifically sizing and angling of the respective surfaces 82, 84 of the outer surface 80 of the first portion 48. Although in a preferred example the lost motion of less than 9 degrees is provided in each direction, the adapter 46 can alternately be configured such that the adapter 46 provides lost motion of greater or lesser degrees than 9 degrees depending upon the particular operational features that are desired.

Figure 6B:
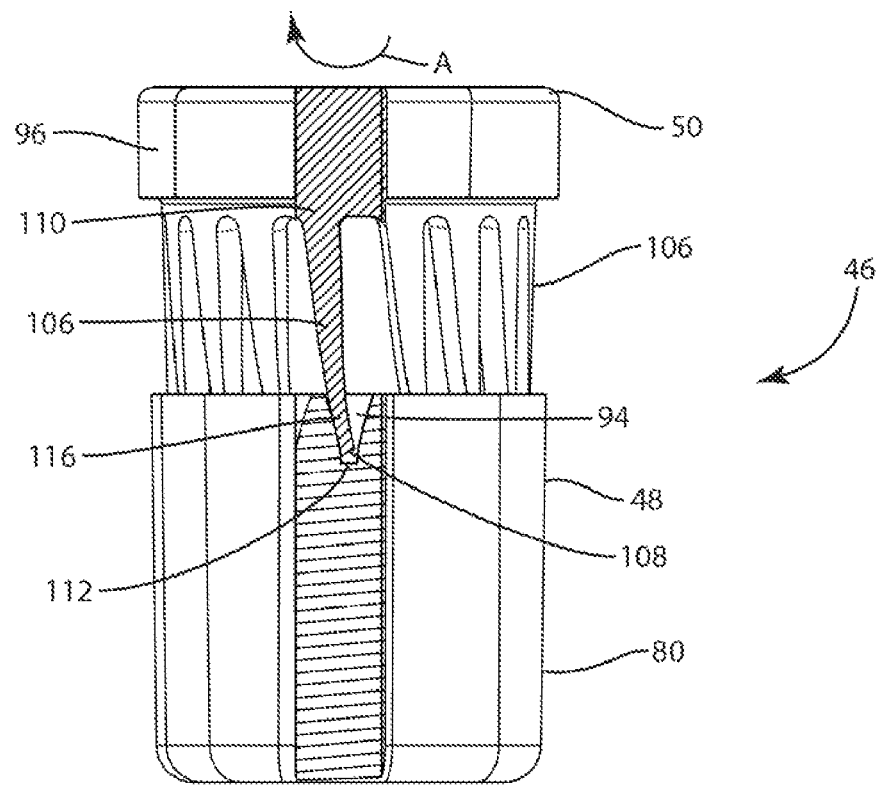
FIG. 6B is a view of the torque transmitting device, shown partially in section, wherein the second portion is axially rotated with respect to the first portion.

The lost motion and the limits thereof are also facilitated by and governed by the torsional strength and elasticity of the torsional members 106. As mentioned above, FIG. 6A shows the adapter 46 at a steady state position. In contrast, FIG. 6B depicts the adapter 46 during rotation of the propulsor shaft 22 wherein relative rotation has occurred between the first portion 48 and second portion 50 of the adapter 46 as a result of propulsor shaft 22 rotation in the direction of arrow A. During such rotation, the torsional members 106 bend or flex until the lower end portion 116 of the torsional member 106 engages with one side of the tapered opening 94, as shown in FIG. 6B. Similar bending and engagement with the opposite side of the opening 94 occurs during rotation in the opposite direction to allow for lost motion in both directions of rotation.

Therefore, in operation, the first portion 48 of the adapter 46 rotates in synchrony with the propulsor shaft 22, but the second portion 50 of the adapter 46 is free to rotate relative to the first portion 48 because of the gap 114 that exists between the first portion 48 and the hub 40 and because of the torsional flexibility of the torsional members 106. Initial relative rotation between the first and second portions 48, 50 results in the bending of torsional members 106 and the transfer of torque between the first and second portions 48, 50 via the torsional members 106. Torque is transferred from the first portion 48 to the second portion 50 and subsequently to the hub 40 because of the relatively close fit between the outer surface 96 of the second portion 50 and the inner circumferential surface 44 of the hub 40. The flexing or bending of the torsional members 106 can absorb pulses of torque transmitted through the propulsor shaft 22 as the pistons of the internal combustion engine fire in sequenced pulses. As a result, reciprocating oscillations of the propulsor shaft 22 are not immediately transferred to the hub 40. The operation of adapter 46 thus significantly decreases prop rattle that is normally caused by noise emanating from the various connections between shafts, clutch, gears in the drive system of the marine propulsion system. This is accomplished without requiring expensive titanium rods or adapter pieces or fittings.

FIG. 8 is a graphical representation which illustrates the relationship between hub torque transmitted from the propulsor shaft 22 to the propulsor hub 40 as a function of relative hub twist or lost motion between the propulsor shaft 22 and the propulsor hub 40, according to the embodiments shown in FIGS. 1-7D. Known systems exhibit a relatively high transfer rate of torque per degree of rotation even at relatively low magnitudes of twist. This is inadequate for providing compliance at low torque magnitudes to reduce prop rattle. Line 120 in FIG. 8 illustrates the relationship provided by the example shown and described with reference to FIGS. 1-7D.

With reference to FIG. 8, the relationship between the propeller shaft 22 and the adapter 46 causes rotational torque to be immediately transmitted from the shaft 22 to the first portion 48. This movement, in synchrony, between the first portion 48 and shaft 22 causes relative rotation to occur between the first portion 48 and the synchronously rotating second portion 50 and hub 42. Therefore, torque is not immediately transmitted between the first portion 48 and the hub 42, as illustrated in FIG. 8. Instead, torque is transmitted between the first portion 48 and second portion 50 via the torsional members 106. The torsional members 106 transmit torque to the second portion 50, causing rotation of the second portion 50 and hub 42. Therefore, at relatively low magnitudes of torque and at relatively low relative rotations between the propulsor shaft 22 and the propulsor hub 42, torque is transmitted only through the torsional members 106. At higher torques, which are sufficient to cause a first portion 48 to rotate relative to the hub 42 and transmit torque therebetween, as described above in reference to FIGS. 7A-7D, additional stress on the torsional members 106 is inhibited and the torque is provided directly from the shaft 22 to the first and second portions 48, 50 and, in turn, to the hub 42.

In a preferred arrangement, the adapter 46 is configured to fail at relatively high torque loads, such as when the propeller 43 hits an obstruction. In this example, the spline connection 26 between the shaft 22 and first portion 48 is designed to shear at a predetermined high torque load, thereby preventing engagement between the shaft 22 and first portion 48. The failure point of the connection between the shaft 22 and adapter 46 is designed so as to be below a predetermined torque load that would otherwise damage the engine. The system 20 could be alternately designed with different failure points other than the spline connection between the shaft 22 and first portion 48.

Figure 9:
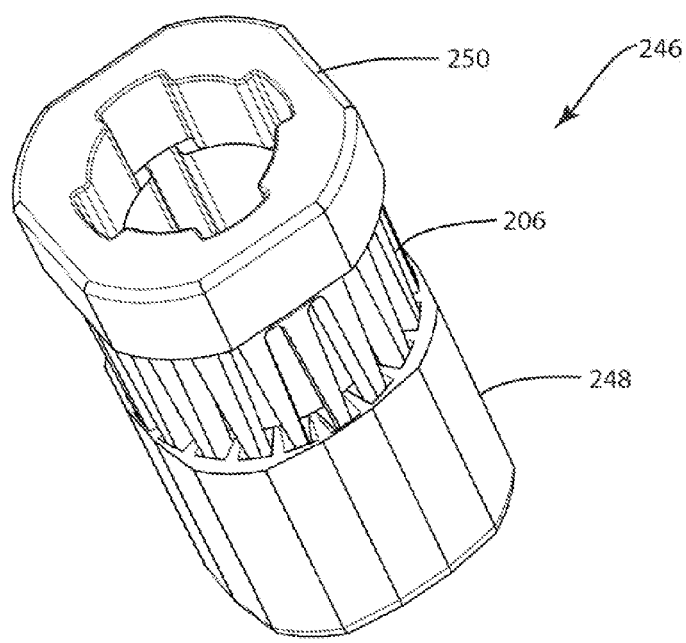
FIG. 9 is a perspective view of a second non-limiting example of a torque transmitting device.
Figure 11:
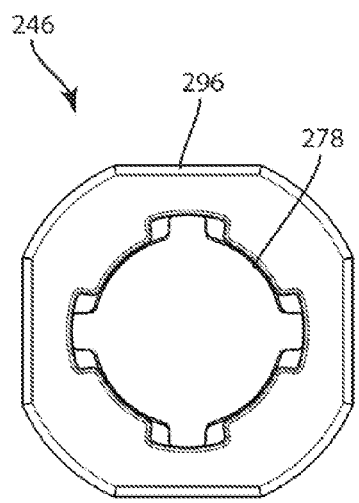
FIG. 11 is a view of a first end of the example shown in FIG. 9.
Figure 10:
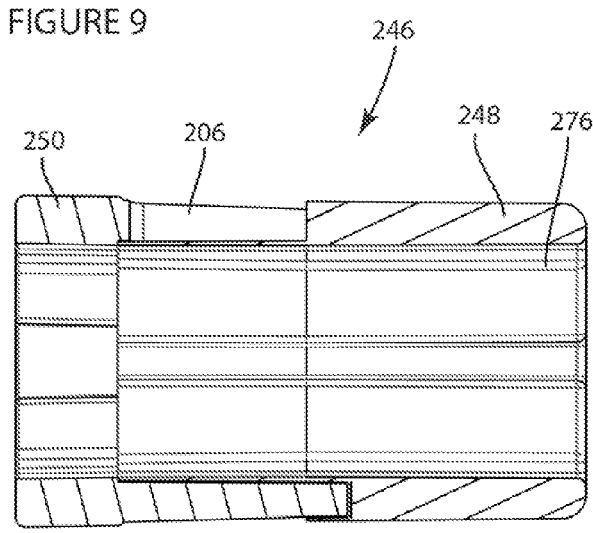
FIG. 10 is a sectional view of the example shown in FIG. 9.

FIGS. 9-11 show another example of a torque transmitting device 246. The device 246 is similar to the device 46 depicted and described herein above in that the device 246 includes first and second portions 248, 250 that are connected by a plurality of elongated torsional members 206 that are integrally attached to at least one of the first and second portions 248, 250, which in this case is the second portion 250. The first portion 248 is shaped to engage in torque transmitting relation with a propulsor shaft 22 of a marine propulsion system so that rotation of the propulsor shaft 22 about the axis of rotation 24 causes synchronous rotation of the first portion 248 about the axis 24 of rotation. See page 13. The elongated torsional members 206 are resilient so as to allow the first portion and second portion to rotate relative to each other about the axis of rotation. In this example, the first portion 248 has an inner surface 276 that is configured to engage with an adapter, such as the "adapter 40" disclosed in U.S. Pat. No. 6,478,543, incorporated hereinabove. Therefore, contrary to the example shown herein in FIGS. 1-7D, the example of FIGS. 9-11 does not have an inner surface having recesses for engaging splines 26 of the propulsor shaft 22. Rather, as stated above, the inner surface is configured for engagement with another adapter (such as "adapter 40" shown in U.S. Pat. No. 6,478,543), which in turn is configured for attachment to the splines 26 of propulsor shaft 22 in the same manner as is described in U.S. Pat. No. 6,478,543.

The second portion 250 is shaped to engage in torque transmitting relation with the propulsor hub 40 of the marine propulsion system, similar to the example of FIGS. 1-7D. The outer surface 296 is configured for friction fit with the inner circumferential surface 44 of the propulsor hub 40. The inner surface 278 is configured similarly to the inner surface of the "second insert portion 32" of the referenced U.S. Pat. No. 6,478,543.

Relative rotation between the first and second portions 248, 250 is thus facilitated and governed by the torsional members 206, as well as engagement with the aforementioned "adapter 40" disclosed in the corresponding U.S. Pat. No. 6,478,543. Similar locking mechanisms including a tab washer and nut can be employed with this type of adapter 246, as is described in U.S. Pat. No. 6,478,543. This example therefore illustrates that it is not essential for the inner surfaces of the adapter 46, 246 to engage directly with the propulsor shaft 22 via a splined coupling.

Figure 12:
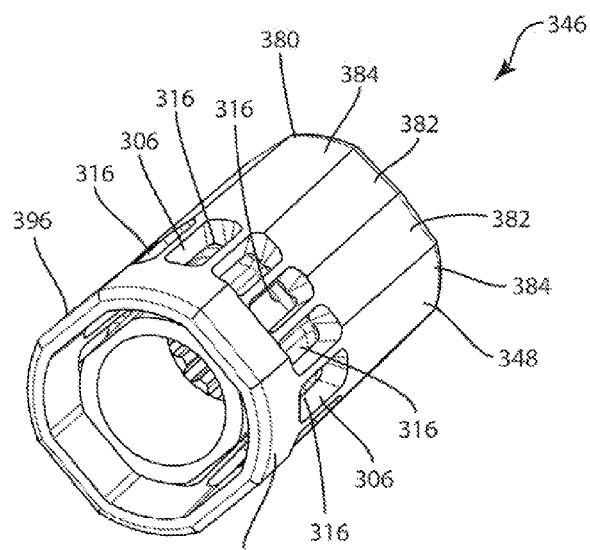
FIG. 12 is a perspective view of a second non-limiting example of a torque transmitting device.
Figures 13, 14:
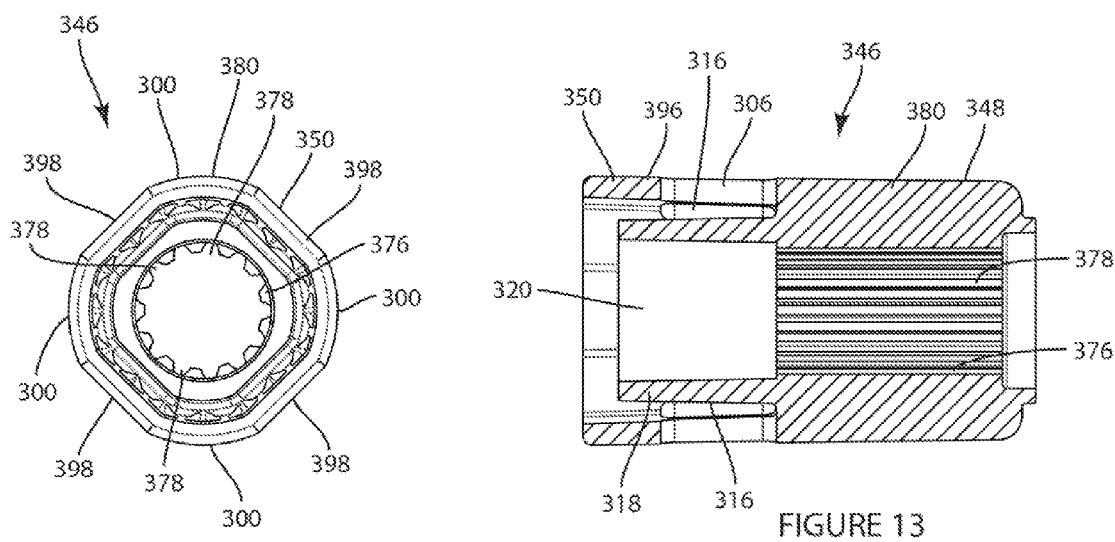
FIG. 13 is a sectional view of the example shown in FIG. 12.
FIG. 14 is a view of a first end of the example shown in FIG. 12.

FIGS. 12-14 depict another non-limiting example of a torque transmitting device including adapter 346. The adapter 346 includes first and second portions 348, 350. The first portion 348 is configured to engage in torque transmitting relation with the propulsor shaft 22 of a marine propulsion system so that rotation of the propulsor shaft 22 about an axis 24 of rotation causes synchronous rotation of the first portion 348 about the axis of rotation. In this example, the synchronous rotation is accomplished by engagement between the splines 26 of a propulsor shaft 22 and a plurality of axially extending recesses 378 on the inner surface 376 of the first portion 348. The second portion 350 is shaped to engage in torque transmitting relation with a propulsor hub 40 of a marine propulsion system. The second portion 350 is connected to the first portion 348 by a plurality of elongated torsional members 306 that are integrally connected to both the first 348 and second 350 portions.

This example illustrates that the first and second portions 348, 350 can both be integrally attached to the torsional members 306. The first portion 348 has an outer surface 380 that includes flat side surfaces 382 and rounded corner surfaces 384 similar to the arrangement shown in FIGS. 4A-4D. The second portion 350 includes an outer surface 396 that has flat side surfaces 398 and rounded corner surfaces 300 for statically engaging an inner circumferential surface 44 of a propeller hub 40. The elongated torsional members 106 form a plurality of openings 316 which are open to an inner collet 318 having a smooth inner surface 320.

In operation, rotation of the propulsor shaft 22 is translated directly to the first portion 348 such that the first portion 348 rotates in synchrony with the propulsor shaft 22 about the axis 24 of rotation. The second portion 350 is allowed to rotate with respect to the first portion 348, up until engagement occurs between the outer surface 380 and inner circumferential surface 44 of the hub 40, as described above, such rotation being governed and facilitated by the torsional members 306 extending therebetween. The second portion 350 is engaged with the inner circumferential surface 44 of the propulsor hub 40 such that the second portion 50 rotates in synchrony with the propulsor hub 40, similar to the operation described above for the example in FIGS. 1-7D.

The invention claimed is:

1. A torque transmitting device for a marine propulsion system, the torque transmitting device comprising:
   an adapter extending along an axis of rotation, the adapter comprising
      a first portion that engages in torque-transmitting relation with a propulsor shaft of the marine propulsion system so that rotation of the propulsor shaft about the axis of rotation causes synchronous rotation of the first portion about the axis of rotation and
      a second portion that engages in torque-transmitting relation with a propulsor hub of the marine propulsion system so that rotation of the second portion about the axis of rotation causes synchronous rotation of the propulsor hub about the axis of rotation,
      the second portion connected to the first portion by a plurality of elongated torsional members that are integrally attached to at least one of the first and second portions,
   wherein the elongated torsional members allow the first portion and second portion to rotate relative to each other about the axis of rotation while remaining connected together by the elongated torsional members,
   wherein the first portion is rotatable relative to the propulsor hub.

2. A torque transmitting device according to claim 1, wherein the plurality of torsional members comprise a plurality of tines extending from one of the first and second portions.

3. A torque transmitting device according to claim 1, wherein the plurality of torsional members are integrally attached to both of the first and second portions.

4. A torque transmitting device according to claim 1, wherein the plurality of torsional members comprise a plurality of tines extending from the second portion into a plurality of openings in the first portion.

5. A torque transmitting device according to claim 4, wherein each tine in the plurality of tines comprises a free end and an end that is integral with the second portion, wherein each tine tapers down from the end that is integral with the second portion to the free end.

6. A torque transmitting device according to claim 5, wherein each opening in the plurality of openings is tapered inwardly and wherein each tine is sized longer than a length of the respective opening in which said tine extends.

7. A torque transmitting device according to claim 1, wherein the first portion comprises an inner surface defining a plurality of axially extending recesses that engage with a plurality of axially extending splines on the propulsor shaft so that the first portion rotates in synchrony with the propulsor shaft.

8. A torque transmitting device according to claim 1, wherein the second portion comprises an outer surface that is received by the propulsor hub and to attach the second portion to the propulsor hub for rotation in synchrony with the propulsor hub about the axis of rotation.

9. A torque transmitting device according to claim 8, wherein the outer surface of the second portion comprises a plurality of circumferentially aligned faces that engage with an inner circumferential surface of the propulsor hub so that no relative rotational motion occurs between the propulsor hub and the second portion during rotation of the propulsor shaft about the axis of rotation.

10. A torque transmitting device according to claim 9, wherein the first and second portions are separable components and wherein the first and second portions are removably attached by the elongated torsional members.

11. A torque transmitting device according to claim 8, wherein the first portion comprises an outer surface that is received by the propulsor hub for rotation about the axis of rotation in a manner wherein relative rotational motion occurs between the first portion and the propeller hub during rotation of the propulsor shaft.

12. A torque transmitting device according to claim 11, wherein the outer surface of the first portion comprises a plurality of circumferentially aligned faces, wherein a gap exists between at least some of the plurality of faces and an inner circumferential surface of the propulsor hub when the second portion is received by the propulsor hub.

13. A torque transmitting device according to claim 1, wherein the first portion comprises a material selected from the group consisting of Delrin 150 NC010, Delrin 311 DP NC010, and Delrin 150E NC010.

14. A torque transmitting device according to claim 1, wherein the first and second portions comprise different materials.

15. A torque transmitting device according to claim 14, wherein the second portion comprises a material selected from the group consisting of Delrin 525 GR NC000, Noryl GTX Resin GTX830 and Noryl GTX Resin GTX8720.

16. A torque transmitting device for a marine propulsion system, the torque transmitting device comprising:
   an adapter extending along an axis of rotation, the adapter comprising
      a first portion that engages in torque-transmitting relation with a propulsor shaft of the marine propulsion system so that rotation of the propulsor shaft about the axis of rotation causes synchronous rotation of the first portion about the axis of rotation and
      a second portion that engages in torque-transmitting relation with a propulsor hub of the marine propulsion system, the second portion connected to the first portion by a plurality of elongated torsional members that are integrally attached to at least one of the first and second portions, wherein the elongated torsional members allow the first portion and second portion to rotate relative to each other about the axis of rotation;

wherein the second portion comprises an outer surface that is received by the propulsor hub and to attach the second portion to the propulsor hub for rotation in synchrony with the propulsor hub about the axis of rotation;

wherein the first portion comprises an outer surface that is received by the propulsor hub for rotation about the axis of rotation in a manner wherein relative rotational motion occurs between the first portion and the propeller hub during rotation of the propulsor shaft;

wherein the first portion is rotatable relative to the propulsor hub by less than 9 degrees in one direction about the axis of rotation and by less than 9 degrees in the other direction about the axis of rotation.

17. A marine propulsion system comprising:
a propulsor shaft rotatable about an axis of rotation;
a propulsor hub rotatable about the axis of rotation;
an adapter extending along the axis of rotation, the adapter comprising:
  a first portion that engages in torque-transmitting relation with the propulsor shaft so that rotation of the propulsor shaft about the axis of rotation causes synchronous rotation of the first portion about the axis of rotation and
  a second portion that engages in torque-transmitting relation with the propulsor hub so that rotation of the second portion about the axis of rotation causes synchronous rotation of the propulsor hub about the axis of rotation,
  the second portion connected to the first portion by a plurality of elongated torsional members that are integrally attached to at least one of the first and second portions,
  wherein the elongated torsional members the first portion and second portion to rotate relative to each other about the axis of rotation while remaining connected together by the elongated torsional members,
  wherein the first portion is rotatable relative to the propulsor hub.

18. A system according to claim 17, comprising a first thrust washer mounted on the propulsor shaft to prevent the propulsor hub from translating axially in a first direction past a predetermined location on the propulsor shaft.

19. A system according to claim 18, comprising a second thrust washer mounted on the propulsor shaft to prevent the propulsor hub from translating axially in a second, opposite direction past a second predetermined location on the propulsor shaft.

20. A system according to claim 19, comprising a locking device for preventing axial translation of the second thrust washer in the second, opposite direction.

21. A system according to claim 19, wherein the first and second thrust washers engage with the propulsor shaft and allow free rotation of the propulsor hub about the propulsor shaft.

22. A marine propulsion system comprising:
a propulsor shaft rotatable about an axis of rotation;
a propulsor hub rotatable about the axis of rotation;
an adapter extending along the axis of rotation, the adapter comprising:
  a first portion that engages in torque-transmitting relation with the propulsor shaft so that rotation of the propulsor shaft about the axis of rotation causes synchronous rotation of the first portion about the axis of rotation and
  a second portion that engages in torque-transmitting relation with the propulsor hub, the second portion connected to the first portion by a plurality of elongated torsional members that are integrally attached to at least one of the first and second portions,
wherein the elongated torsional members that allow the first portion and second portion to rotate relative to each other about the axis of rotation;
a first thrust washer mounted on the propulsor shaft to prevent the propulsor hub from translating axially in a first direction past a predetermined location on the propulsor shaft; and
wherein the first thrust washer comprises an inner surface defining a plurality of axially extending recesses that engage with a plurality of axially extending splines on the propulsor shaft so that the first thrust washer rotates in synchrony with the propulsor shaft.

23. A marine propulsion system comprising:
a propulsor shaft rotatable about an axis of rotation;
a propulsor hub rotatable about the axis of rotation;
an adapter extending along the axis of rotation, the adapter comprising:
  a first portion that engages in torque-transmitting relation with the propulsor shaft so that rotation of the propulsor shaft about the axis of rotation causes synchronous rotation of the first portion about the axis of rotation and
  a second portion that engages in torque-transmitting relation with the propulsor hub the second portion connected to the first portion by a plurality of elongated torsional members that are integrally attached to at least one of the first and second portions,
wherein the elongated torsional members allow the first portion and second portion to rotate relative to each other about the axis of rotation;
a first thrust washer mounted on the propulsor shaft to prevent the propulsor hub from translating axially in a first direction past a predetermined location on the propulsor shaft;
a second thrust washer mounted on the propulsor shaft to prevent the propulsor hub from translating axially in a second, opposite direction past a second predetermined location on the propulsor shaft; and
wherein the second thrust washer comprises an inner surface defining a plurality of axially extending recesses that engage with the plurality of axially extending splines on the propulsor shaft so that the second thrust washer rotates in synchrony with the propulsor shaft.

24. A marine propulsion system comprising:
a propulsor shaft rotatable about an axis of rotation;
a propulsor hub rotatable about the axis of rotation;
an adapter extending along the axis of rotation, the adapter comprising:
  a first portion that engages in torque-transmitting relation with the propulsor shaft so that rotation of the propulsor shaft about the axis of rotation causes synchronous rotation of the first portion about the axis of rotation and
  a second portion that engages in torque-transmitting relation with the propulsor hub, the second portion connected to the first portion by a plurality of elongated torsional members that are integrally attached to at least one of the first and second portions, wherein the elongated torsional members allow the first portion and second portion to rotate relative to each other about the axis of rotation;

a first thrust washer mounted on the propulsor shaft to prevent the propulsor hub from translating axially in a first direction past a predetermined location on the propulsor shaft;

a second thrust washer mounted on the propulsor shaft to prevent the propulsor hub from translating axially in a second, opposite direction past a second predetermined location on the propulsor shaft; and wherein the second thrust washer comprises an annular ridge sized smaller than an annular recess on the second portion, wherein the annular ridge of the second thrust washer nests within the annular recess on the second portion when the second thrust washer and propulsor hub are mounted on the propulsor shaft.

25. A marine propulsion system comprising:

a propulsor shaft rotatable about an axis of rotation;

a propulsor hub rotatable about the axis of rotation;

an adapter extending along the axis of rotation, the adapter comprising:

a first portion that engages in torque transmitting relation with the propulsor shaft so that rotation of the propulsor shaft about the axis of rotation causes synchronous rotation of the first portion about the axis of rotation and a second portion that engages in torque transmitting relation with the propulsor hub, the second portion connected to the first portion by a plurality of elongated torsional members that are integrally attached to at least one of the first and second portions, wherein the elongated torsional members allow the first portion and second portion to rotate relative to each other about the axis of rotation;

a first thrust washer mounted on the propulsor shaft to prevent the propulsor hub from translating axially in a first direction past a first predetermined location on the propulsor shaft;

a second thrust washer mounted on the propulsor shaft to prevent the propulsor hub from translating axially in a second, opposite direction past a second predetermined location on the propulsor shaft;

a locking device for preventing axial translation of the second thrust washer in the second, opposite direction;

wherein the first and second thrust washers engage with the propulsor shaft and allow free rotation of the propulsor hub about the propulsor shaft; and wherein the first portion and the second portion are made of different materials.

* * * * *